United States Patent
Fechter et al.

[11] Patent Number: 6,014,592
[45] Date of Patent: Jan. 11, 2000

[54] CHEESE-PRODUCING TEXTILE MACHINE

[75] Inventors: Ulrich Fechter; Peter Schwartz, both of Mönchengladbach, Germany

[73] Assignee: W. Schlafhorst AG & Co., Moenchengladbach, Germany

[21] Appl. No.: 08/969,728

[22] Filed: Nov. 13, 1997

[51] Int. Cl.[7] .............................. G06F 19/00; G06G 7/66
[52] U.S. Cl. .................... 700/130; 700/139; 700/140; 700/142; 242/157.1; 242/473.6; 242/483.5; 242/485.9
[58] Field of Search .................... 364/470.01, 470.02, 364/470.03, 470.04, 470.05, 470.06, 470.07, 470.08, 470.09, 470.11, 470.12, 470.13, 470.15, 470.14, 470.1; 242/39, 35.5 A, 35.5 R, 18.5, 54, 483.5, 43.6, 157.1, 485.9; 57/281, 270, 261, 263, 264; 700/130, 131, 132, 133, 139, 140, 142

[56] References Cited

U.S. PATENT DOCUMENTS

| | | | |
|---|---|---|---|
| 5,016,830 | 5/1991 | Wey | 242/35.5 A |
| 5,564,638 | 10/1996 | Schmitz | 242/35.5 A |
| 5,582,354 | 12/1996 | Peters | 242/35.5 A |
| 5,634,603 | 6/1997 | Raasch et al. | 242/35.5 A |
| 5,697,565 | 12/1997 | Zitzen | 242/18 DD |
| 5,762,277 | 6/1998 | Uedinger et al. | 242/158.3 |
| 5,801,949 | 9/1998 | Raasch et al. | 364/470 |
| 5,823,460 | 10/1998 | Hermanns | 242/485.7 |

FOREIGN PATENT DOCUMENTS

| | | |
|---|---|---|
| 0 720 096 A2 | 9/1989 | European Pat. Off. . |
| 0 536 540 B1 | 2/1996 | European Pat. Off. . |
| OS 23 13 497 | 10/1973 | Germany . |
| 29 52 500 C2 | 7/1987 | Germany . |
| GM 89 01 804 | 9/1989 | Germany . |
| 42 21 504 A1 | 1/1993 | Germany . |
| 42 12 629 A1 | 10/1993 | Germany . |
| 44 22 523 A1 | 1/1996 | Germany . |
| 195 05 023 A1 | 8/1996 | Germany . |
| 42 30 984 C2 | 10/1996 | Germany . |
| WO 90/09624 A1 | 8/1990 | WIPO . |

OTHER PUBLICATIONS

Klaus Bender et al.; Mikrorechner, Struktur und Programmierung; VDI–Verlag GmbH; 1977; pp. 46–47.

Dr. Marcel Siegenthaler; Umfassende Prozesssteuerung in der Ringspinnerei; Melliand Textilberichte; Nov. 1992; pp. 880–883.

*Primary Examiner*—Paul P. Gordon
*Assistant Examiner*—Ramesh Patel
*Attorney, Agent, or Firm*—Kennedy Covington Lobdell & Hickman, LLP

[57] ABSTRACT

A cheese-producing textile machine 1 with a central control unit 37 and a plurality of winding stations 2 which are serviced by an autonomously operating service unit 23. The central control unit 37 of the textile machine 1 is connected via a machine bus 40 with individual winding station computers 39 as well as with a control device 38 of the service unit 23. Control programs A, B, C, D, etc. are stored in the control device 38 of the service unit 23, and are specially adapted to various respective structural configurations of the service unit 23. It is possible in a simple manner to activate the control programs A, B, C, D, etc. in correspondence to the particular prevailing structural configuration of the service unit 23 by means of appropriate software encoding via an input element 41 on the central control unit 23.

9 Claims, 2 Drawing Sheets

CHEESE-PRODUCING TEXTILE MACHINE

FIELD OF THE INVENTION

The present invention relates to a cheese-producing textile machine having a plurality of work stations arranged next to each other and, more particularly, to such a textile machine having a work station computer connected to a central textile machine-dedicated control unit and a service unit movable along the work stations with its own control device also connected with the central control unit.

BACKGROUND OF THE INVENTION

In such cheese-producing textile machines, for example automatic cheese-winding machines, it has been customary for some time that the textile machines differ in respect to the special demands of the various textile companies both as to their output as well as their equipment. The same applies to the associated service units which also can be provided in different equipment variations.

For example, the automatic cheese-winding machine can be equipped with an additional cheese storage means. Such a design of the textile machine results in a bobbin deposition which differs from the "normal" bobbin deposition position, and such must be taken into consideration by the associated service unit through appropriate adaptation of the control of the related handling elements.

The service units can also differ by provision of additional features. For example, the service unit can be operated with or without a blower device, or can have a complementary mechanical device which makes it possible to provide the completed cheeses with an additional reserve top winding.

When operating a service unit with a blower device, the rotational speed of the drive motor of the service unit must be adapted to the blower device, along with a changed drive gear. The provision of a mechanical top reserve winding device requires a change in the functional sequence of the service unit.

Heretofore, it has been customary to adapt the control of these service units by means of a corresponding structural hardware control configuration, e.g., the adaptation of the control to the respective structural configuration of the service unit or the textile machine is accomplished by the insertion of wire bridges into the wiring of the control unit.

However, it is also known in the structural configuration of such service units to employ additional switching elements, socalled pre-selection switches. In this case the pre-selection switches have a plurality of manually operable switches which must be individually set in correspondence to the respective structural configuration of the service units, which requires a relatively large amount of time. Furthermore, such pre-selection switches are quite expensive.

An automatic cheese winding-machine is known from German Patent Publication DE 42 21 504 A1, whose work stations are connected with a service vehicle via a bus line. If one of the work stations requires service, the work station transmits an optical signal, which is detected by the service unit patrolling in front of the work stations. After the service unit has been positioned at the respective work station, the service unit acknowledges the signal by a light signal to the work station. The respective work station is activated by this light signal to subsequently enable the service vehicle to issue work commands via the bus line to the respective work station.

Another textile machine arrangement is described in European Patent Publication EP 0 536 540 B1, which enables the exchange of data between several service units and a central station. In this case, the service units are conducted along a closed track system extending along the work stations of the textile machines. The track system has current conductors as well as separate data lines, to which the service units are respectively connected by a wiper contact device. The track-bound conductor system has at least two and at most three data lines, which are respectively connected to form a ring line, to which the transmitter/receiver devices of the central station and the transmitter/receiver devices of the service units are connected. The data are transmitted by the transmitter devices in the form of pulses of a predetermined pulse length and with predetermined spacing, wherein each data pulse is simultaneously transmitted with opposite polarity to two data lines. The receiver devices are designed such that only those incoming pulses which are received simultaneously via both data lines and have a predetermined minimum signal output are evaluated.

A further variant of a data transmission means between a service unit of a textile machine and a central control unit of the textile machine is known from German Patent Publication DE 42 12 629 A1. With this device, the communication between the service unit and the machine control computer of a ring spinning machine takes place via current lines which are already present. One respective interface is placed between the computer of the service unit and the current conductor as well as between the machine control computer of the ring spinning machine and the current conductor, which makes it possible to utilize the lines, which actually are intended for current supply, also for data transmission.

OBJECT AND SUMMARY OF THE INVENTION

Based on the above mentioned state of the art, it is a basic object of the present invention to provide a cheese-producing textile machine wherein the operation of a service unit movable along the work stations of the textile machine is improved and wherein the setting of its control device in relation to the respective structural configuration of the service unit is made easier.

In accordance with the invention, this object is attained by a cheese-producing textile machine which basically comprises a plurality of adjacent work stations, a central control unit dedicated to the textile machine, a plurality of individual control devices respectively associated with the work stations and connected with the central control unit, and a service unit movable along the work stations. The service unit has a control device connected with the central control unit in which control device are stored a plurality of control programs respectively adapted to different possible structural configurations of the service unit to be selectively activated by means of software encoding to correspond to a prevailing structural configuration of the service unit.

The textile machine in accordance with the present invention has the particular advantage that the associated service units are equipped in the same way in respect to the control programs loaded in their respective control devices, regardless of their respective structural configurations, both as to the mechanical structure as well as the electronic technical control hardware of these service units. Thus, the control devices of these service units have standardized software (control programs adapted to the various structural configurations of the service unit) which can be activated at any time by simple software encoding.

In one advantageous design the central control unit dedicated to the textile machine may have an input device so that easy operator activation of the appropriate control program is possible from the central control unit via the machine bus.

A further feature provides for the possibility of inputting software encoding of the control device directly at the service unit in addition to or in place of an input element at the central control unit. In this case, the service unit has input means connected to its control device. An individual and user-friendly software encoding of the control device of the service unit in accordance with its respective structural configuration is also possible by means of such an input device.

In an advantageous further aspect of the invention, the problem-free adaptation of the control device to the structural configuration of the service unit is possible by an appropriate software encoding of the control device of the service unit, and also a control program can be activated by means of further software encoding which takes different operating conditions at the work stations of the textile machine into consideration. Thus, a device designed in this manner makes it possible to create a rapid and optimal adaptation to the operational conditions at the work stations of the textile machine.

The control programs stored in the control device of the service unit are preferably laid out in such a way that, with different operating conditions in connection with the supply of the textile machine with multiple batches of cops, different operational states can be taken into consideration. Thus, optimized batch-specific operating conditions are always provided at each of the work stations.

The control device of the service unit can furthermore be encoded in respect to the software such that, for example, bobbins with a top reserve winding are created on a portion of the work stations of the automatic cheese-winding machine, while cheeses without such a top reserve winding are produced in the remaining work stations.

In a preferred embodiment, it is provided that, even in case of a power restoration following a power loss at the textile machine, no impairment of the operation of the textile machine or its associated service unit will occur. Specifically, the invention provides that, when the power is restored, all control programs set in the control device of the service unit prior to the power loss are reactivated automatically from the central control unit via the machine bus such that it is assured that the operational state present prior to the power loss is restored after the restart of the textile machine.

Since the central control unit dedicated to the textile machine is connected via a machine bus with the control device of the service unit as well as with the individual work station computers of the winding stations, a software encoding of the control device of the service unit is possible in a simple manner, for example by menu control, via the input element associated with the textile machine-specific central control unit as well as via input means at the service unit. Not only is it easy by means of these input options to set the work station computers of the winding stations to defined operating parameters, for example from the central control unit, it is also possible by means of an uncomplicated software encoding to provide a setting of the control device of the service unit in accordance with the respective structural configuration of the independently operating service unit without problems.

Further features, advantages and details of the present invention will be recognized and understood with reference to an exemplary embodiment described hereinbelow and represented in the accompanying drawings.

DETAILED DESCRIPTION OF THE PREFERRED EMBODIMENT

Figure 1:
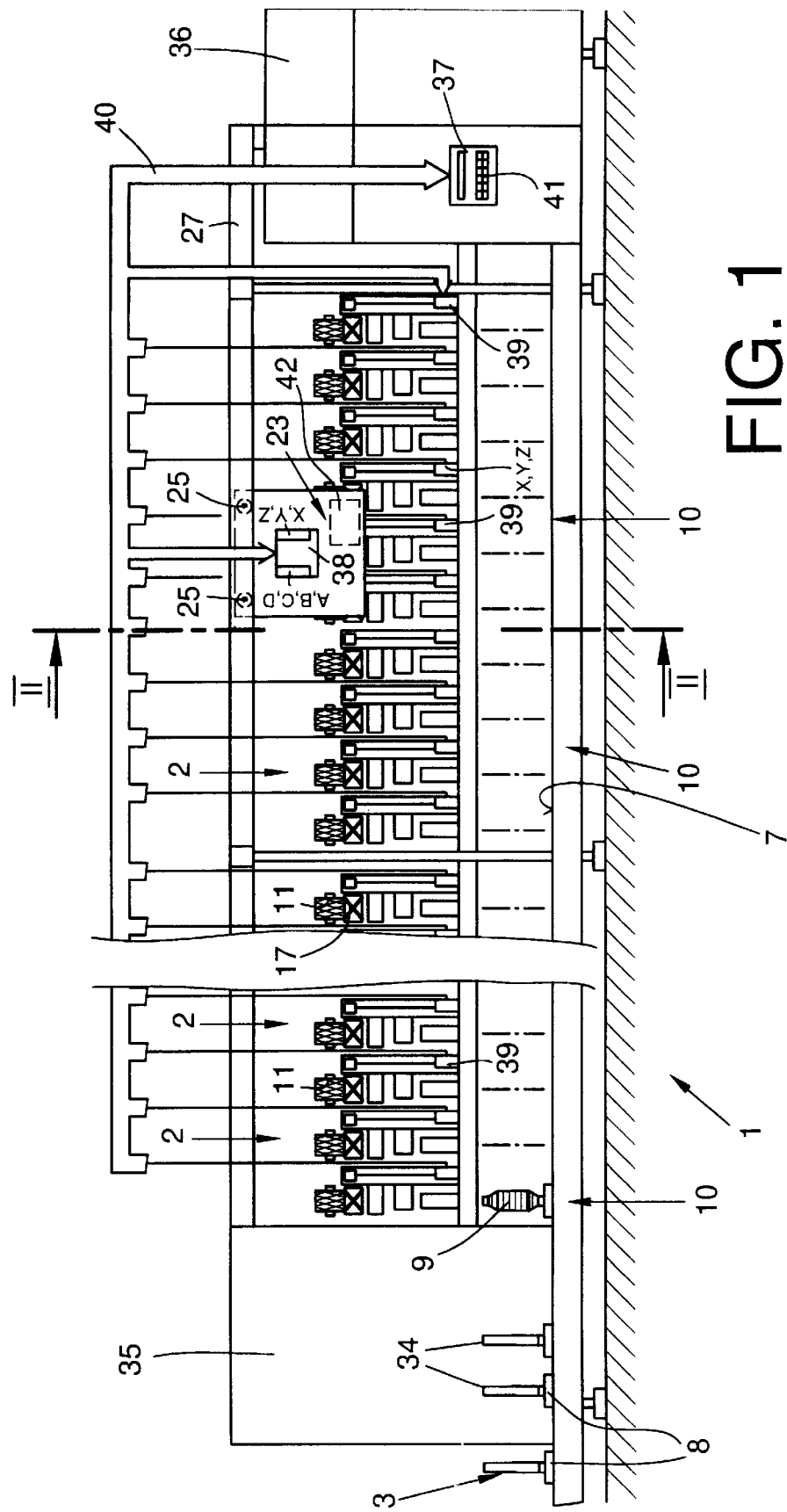
FIG. 1 is a front view of a cheese-producing textile machine having a plurality of work stations equipped with individual work station computers and a central control unit connected via a machine bus with the individual work station computers as well as with the control of a service unit movable along the work stations.

Referring now to the accompanying drawings and initially to FIG. 1, a cheese-producing textile machine, in the form of an automatic cheese-winding machine in the exemplary embodiment, is schematically shown in FIG. 1 in a front view and is identified as a whole by the reference numeral 1. Customarily such automatic cheese-winding machines 1 have a plurality of work stations of the same type aligned between their end frames 35, 36, represented in the present case by the multiple winding stations 2. As is known and therefore not explained in detail, the spinning cops 9 produced on a ring-spinning machine (not represented) are rewound into large volume cheeses 11 by these winding stations 2.

Fully-wound finished cheeses 11 are discharged from the winding stations 2 by means of an autonomously operating service unit, for example a so-called cheese changer 23, onto a cheese transport device 21 (FIG. 2) by which the finished cheeses are transported to a bobbin loading station (not represented) or the like disposed at the end of the machine.

As also known, such automatic cheese-winding machines 1 have a bobbin and tube transport system 3, in which travel the yarn-carrying spinning cops 9 or empty tubes 34, positioned in vertical orientation on supporting transport plates 8 (such as pallets or so-called peg trays). Only a return track 7 of this bobbin and tube transport system 3, onto which empty unwound tubes 34 or cops 9 having some unwinding difficulty are discharged from the winding stations, has been indicated in the foreground in FIG. 1. The transport track 4 of the transport system 3 for delivering full cops 9 to the winding machine 1 is shown in FIG. 2.

The automatic cheese-winding machine 1 has a central control unit 37, which is connected via a machine bus 40 with individual work station computers 39 associated with the respective winding stations 2 as well as with a control device 38 of the service unit 23. In a preferred embodiment, the central control unit 37 has an input device 41, such as a keyboard, through which various operations may be selected and controlled from the central control unit 37, such as selection of the work station computers 39 of the winding stations 2, a software encoding of the control device 38 of the service unit 23, and like operations. In place of or in addition to an input device for the textile machine-dedicated central control unit 37, it is contemplated to be possible, as indicated in broken lines in FIGS. 1 and 2, to provide appropriate input means 42 arranged on the service unit 23 for the software encoding of its control device 38.

Figure 2:
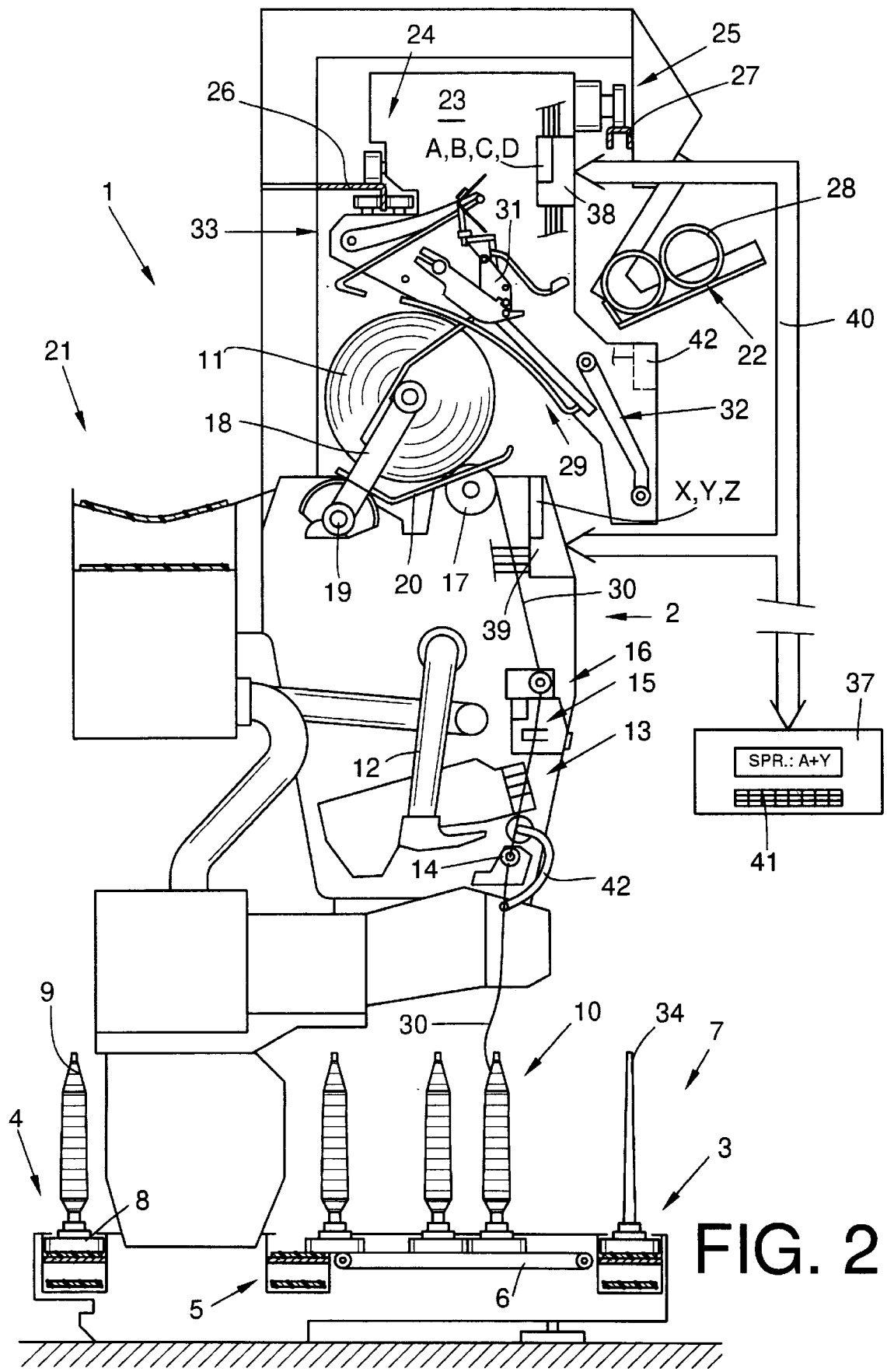
FIG. 2 is a lateral cross-sectional view of one of the work stations of the cheese-producing textile machine of FIG. 1 taken along section line II—II in FIG. 1.

As indicated in FIG. 1 and represented in greater detail in FIG. 2, the service unit 23 is movably mounted by means of running gear, such as wheels 24, 25, on longitudinal tracks 26, 27 extending over the length of the machine at a disposition above the winding stations 2. In this case, the service unit 23 not only serves to transfer the finished cheeses 11 from the winding stations 2 onto the cheese transport device 21, but also autonomously transfers a fresh empty winding tube 28 into the winding frame 18 of the respective winding station 2 from an empty tube magazine 22 dedicated to the respective winding station.

FIG. 2 represents a lateral view of a winding station 2 of the cheese-producing textile machine 1. As already indicated above, such textile machines have a bobbin and tube transport system 3. Only the cop transport track 4 extending along the length of the machine, an associated reversing cop supply track 5 extending behind the winding stations, one of the transverse transport tracks 6 leading to the winding stations 2, and the return track 7 of this extensive transport system 3 are represented in FIG. 2. As already indicated above, spinning cops 9 which were produced on a ring spinning machine (not shown) and are standing in a vertical orientation on transport plates 8, as well as empty unwound tubes 34 also supported on transport plates 8, are transported on this transport system 3.

The spinning cops 9 are rewound one-by-one into large volume cheeses 11 at an unwinding position 10 of each winding station 2. In FIG. 2, the path of a yarn being unwound from the spinning cop 9 to the cheese 11 is indicated at 30. As is known and therefore not shown in detail, the individual winding stations have various devices which assure a proper operation of these work stations, e.g., as represented by a suction nozzle 12, a gripper tube 42, a splicing device 13, a yarn tensioning unit 14, a yarn cleaner with a yarn cutting device 15 and a paraffin application unit 16.

A bobbin drive drum 17 peripherally drives the cheese 11 by friction during the winding process. During the winding process, the cheese 11 is held in a winding frame 18, which is pivotally seated around a shaft 19. A pivoting sheet metal plate 20 is arranged for limited pivotability around the shaft 19, below the winding frame 18. The cheese transport device 21 extends behind the winding stations 2 for receiving and conveying the finished cheeses to a loading station (not shown), disposed at the end of the machine. Each winding station furthermore has an empty tube magazine 22, in which empty tubes 28 for winding a cheese 11 are held in reserve.

The winding stations 2 are serviced by the cheese changer 23 or another service unit to maintain essentially continuous operation. Specifically, the cheese changer 23 travels on tracks 26, 27 by means of its running gears 24, 25 along the winding stations and, at winding stations whose cheeses 11 have attained a predetermined cross section, discharges the cheeses onto the cheese transport device 21 and thereafter transfers a fresh empty tube 28 from the empty tube magazine 22 into the winding frame 18. The handling elements utilized by the service unit during the process of exchanging cheeses and empty tubes, namely a frame opener 29, a frame lifter 32, a bobbin guide device 33 and a tube feeder 31, are also represented in FIG. 2.

For the sake of clarity, however, the further handling elements of such cheese winders, e.g., the device for preparing a top reserve winding as well as the device for placing the yarn 30 on the empty tube 28, have been omitted from the drawings.

As indicated above and as shown in FIGS. 1 and 2, the central control unit 37 of the textile machine 1 is connected via the machine bus 40 with the work station computers 39 of the individual winding stations 2 as well as with the control device 38 of the service unit 23. The keyboard 41 or other input device of the central control unit 37 enables the control device 38 of the service unit 23 to be encoded with a selected structural configuration for control of the winding operation, for example by selecting one of a plurality of control programs A, B, C, D, etc. stored in the control device 38 of the service unit 23. In this manner, several control programs A, B, C, D, etc., which are respectively tailored to the various structural configurations of the service unit, may be stored in the control device 38 of the service unit 23 and can be activated by the central control unit 37 by means of appropriate software encodings. The control device 38 can furthermore have various control programs X, Y, Z, etc., which take different operating conditions at the work stations 2 into consideration. These control programs X, Y, Z, etc. can also be selected, for example via a menu control, utilizing the input keyboard 41 of the central control unit 37.

It is accordingly possible by means of a simple software encoding of the control device 38 of the service unit 23 from the central control unit 37 to select the control program A, B, C, etc., which corresponds to the present structural configuration of the service unit 23. Thus, when selecting the appropriate control program, it is taken into consideration, for example, whether the service unit is operated with a blowing device or whether the service unit has a device for preparing a top reserve winding. If such a device for preparing a top reserve winding is present it is possible by means of the activation of the appropriate control program to determine, at which work stations this device is to be employed.

Since different variants are also possible regarding the equipment or the operation of the textile machine, which are taken into consideration, for example, by means of the control programs X, Y, Z, etc., an adaptation to the operating conditions at the work positions 2 is possible in a simple manner by an appropriate software encoding of the control device 38 of the service unit 23.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A cheese-producing textile machine comprising:
   a plurality of adjacent work stations,
   a central control computer dedicated to the textile machine,
   a plurality of individual control computers respectively associated with the work stations and connected in data communication with the central control computer, and
   a service unit movable along the work stations and having a plurality of different possible structural configurations, said service unit including a control computer having stored therein a plurality of alternative control programs selectively activated through software encoding for controlling the operation of the service unit, each control program corresponding to one of a plurality of the different possible structural configurations of the service unit.

2. The cheese-producing textile machine in accordance with claim 1, wherein the control computer of the service unit stores a second plurality of control programs corresponding to different operating conditions at the work stations, the first and second control programs being activatable by means of software encoding.

3. The cheese-producing textile machine in accordance with claim 2, wherein the control computer of the service unit includes software encoding means for controlling individual work stations according to a multiple batches of cops being unwound thereat.

4. The cheese-producing textile machine in accordance with claim 1, wherein the central control computer includes means for activating automatically the control programs following a power outage to the textile machine.

5. The cheese-producing textile machine in accordance with claim 1, wherein in one of the plurality of different structural configurations of the service unit, the service unit includes a blower device, and wherein in another one of the plurality of different structural configurations of the service unit, the service unit includes a mechanical top reverse winding device.

6. The cheese-producing textile machine in accordance with claim 1, wherein the control computer of the service unit is directly connected in data communication with the central control computer.

7. The cheese-producing textile machine in accordance with claim 1, wherein the service unit is directly connected in data communication with the central control computer via a machine bus for software encoding of the control computer of the service unit by the central control computer.

8. The cheese-producing textile machine in accordance with claim 7, wherein the central control computer further includes an input device by which the prevailing structural configuration of the service unit is identified.

9. The cheese-producing textile machine in accordance with claim 1, wherein the service unit further includes an input device by which the prevailing structural configuration of the service unit is identified and a machine bus connecting in data communication the input device with the control computer of the service unit for software encoding of the control computer of the service unit.

* * * * *